(12) United States Patent
Bussmann et al.

(10) Patent No.: US 9,884,569 B2
(45) Date of Patent: Feb. 6, 2018

(54) BRAKE CONTROL DEVICE FOR A VEHICLE AND METHOD FOR OPERATING AT LEAST ONE ELECTRIC DRIVE MOTOR FOR A VEHICLE

(71) Applicant: Robert Bosch GmbH, Stuttgart (DE)

(72) Inventors: Otmar Bussmann, Abstatt (DE); Urs Bauer, Sachsenheim (DE); Frank Kaestner, Bietigheim-Bessingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 99 days.

(21) Appl. No.: 14/425,084

(22) PCT Filed: Jul. 8, 2013

(86) PCT No.: PCT/EP2013/064384
§ 371 (c)(1),
(2) Date: Mar. 2, 2015

(87) PCT Pub. No.: WO2014/032839
PCT Pub. Date: Mar. 6, 2014

(65) Prior Publication Data
US 2015/0202989 A1  Jul. 23, 2015

(30) Foreign Application Priority Data
Aug. 29, 2012  (DE) .................. 10 2012 215 328

(51) Int. Cl.
*B60L 15/20* (2006.01)
*B60T 1/10* (2006.01)
(Continued)

(52) U.S. Cl.
CPC ............. *B60L 15/2009* (2013.01); *B60L 7/26* (2013.01); *B60T 1/10* (2013.01); *B60T 7/04* (2013.01);
(Continued)

(58) Field of Classification Search
CPC ...... B60L 7/10; B60L 7/24; B60L 7/26; B60L 7/006; B60L 15/2009; B60W 10/08;
(Continued)

(56) References Cited

U.S. PATENT DOCUMENTS

| | | |
|---|---|---|
| 5,378,053 A | 1/1995 | Patient et al. |
| 5,399,000 A | 3/1995 | Aoki et al. |

(Continued)

FOREIGN PATENT DOCUMENTS

| | | |
|---|---|---|
| DE | 102005029373 | 6/2006 |
| DE | 102009001258 | 9/2010 |

(Continued)

OTHER PUBLICATIONS

International Search Report for PCT/EP2013/064384, dated Nov. 18, 2013.

*Primary Examiner* — Thomas G Black
*Assistant Examiner* — Sze-Hon Kong
(74) *Attorney, Agent, or Firm* — Norton Rose Fulbright US LLP; Gerard Messina

(57) ABSTRACT

A brake control device is provided for a vehicle having an activation device, with the aid of which, at least under consideration of at least one brake demand signal provided by an on-board sensor and/or control device, at least one first control signal may be output to at least one electric drive motor of the vehicle, with which the at least one electric drive motor is controllable into a motor mode, in which a generator braking torque which is unequal to zero may be exerted on at least one wheel of the vehicle by the at least one electric drive motor, the at least one electric drive motor being controllable with the aid of the at least one first control signal into at least one overload operating mode as the motor mode, in which the generator braking torque which is unequal to zero may be exerted on the at least one wheel. A (Continued)

method is also provided for operating at least one electric drive motor for a vehicle.

19 Claims, 2 Drawing Sheets

(51) Int. Cl.
*B60L 7/26* (2006.01)
*B60W 10/08* (2006.01)
*B60W 10/184* (2012.01)
*B60W 30/18* (2012.01)
*B60T 7/04* (2006.01)
*B60W 20/14* (2016.01)
*B60K 7/00* (2006.01)

(52) U.S. Cl.
CPC .......... *B60W 10/08* (2013.01); *B60W 10/184* (2013.01); *B60W 20/14* (2016.01); *B60W 30/18127* (2013.01); *B60K 7/0007* (2013.01); *B60T 2270/604* (2013.01); *B60W 2710/083* (2013.01); *B60Y 2300/89* (2013.01); *Y02T 10/7258* (2013.01)

(58) Field of Classification Search
CPC .............. B60W 10/18; B60W 10/188; B60W 30/18109; B60W 30/18127; B60W 20/14; B60W 10/184; B60T 1/10; B60T 7/04
See application file for complete search history.

(56) References Cited

U.S. PATENT DOCUMENTS

| | | | | |
|---|---|---|---|---|
| 6,213,571 | B1* | 4/2001 | Yamada | B60L 7/006 188/158 |
| 7,571,967 | B2* | 8/2009 | Saito | B60L 7/26 303/15 |
| 2008/0093179 | A1 | 4/2008 | Jager et al. | |
| 2010/0025135 | A1* | 2/2010 | Reuter | B60L 7/10 180/65.265 |
| 2011/0278913 | A1 | 11/2011 | Kim | |
| 2011/0304198 | A1 | 12/2011 | Cottrell | |
| 2012/0029766 | A1* | 2/2012 | Niwa | B60L 7/18 701/36 |

FOREIGN PATENT DOCUMENTS

| | | |
|---|---|---|
| EP | 0901931 | 3/1999 |
| FR | 2923422 | 5/2009 |
| GB | 2282651 | 4/1995 |
| GB | 2450410 | 12/2008 |
| JP | 2001-177904 A | 6/2001 |
| JP | 2006-232117 A | 9/2006 |
| JP | 2010041915 A | 2/2010 |
| JP | 2011223648 A | 11/2011 |
| WO | WO2004/080774 | 9/2004 |

\* cited by examiner

BRAKE CONTROL DEVICE FOR A VEHICLE AND METHOD FOR OPERATING AT LEAST ONE ELECTRIC DRIVE MOTOR FOR A VEHICLE

FIELD OF THE INVENTION

The present invention relates to a brake control device for a vehicle. The present invention also relates to a braking system for a vehicle. Moreover, the present invention relates to a method for operating at least one electric drive motor for a vehicle.

BACKGROUND INFORMATION

British Published Patent Application No. 2 282 651 describes an electric vehicle having a hydraulic braking system. One wheel brake cylinder of the hydraulic braking system is assigned to each wheel of the vehicle, the wheel brake cylinder being connected to the master brake cylinder of the hydraulic braking system via at least one brake line. Furthermore, an electric motor, with the aid of which additional deceleration of the assigned wheel is to be achievable, is situated at at least one of the wheels.

SUMMARY

The present invention provides a brake control device for a vehicle, a braking system for a vehicle, and a method for operating at least one electric drive motor for a vehicle.

The present invention enables an increased generator braking torque for faster deceleration of the at least one wheel while operating the at least one electric drive motor in the at least one overload operating mode. In this way a vehicle may be decelerated more quickly with the aid of the present invention, in particular in an emergency braking situation.

The present invention thus makes use of the possibility that the at least one electric drive motor of a vehicle may be operated at least briefly in an overload operating mode without thermal damage occurring at the at least one electric drive motor. Thus a larger generator braking torque may be exerted at least briefly on the at least one assigned wheel than would be the case when operating the at least one electric drive motor of the vehicle in a nominal mode/nominal operation. The electric drive motor is preferably to be understood to mean a combination of a motor, power electronics, and a controller. Normally, the power electronics is the most vulnerable part of the combination in a brief overload. With the aid of the present invention, a larger generator braking torque may nevertheless be exerted at least briefly.

The at least one overload operating mode of the at least one electric drive motor may be understood to mean a mode in which the at least one electric drive motor of a vehicle is operated at greater power than in its nominal operation. For this reason, the at least one overload operating mode of the at least one electric drive motor may be described as a mode thereof which uses a power which, if the at least one electric drive motor is operated over a long period, would result in thermal damage thereof with this power.

Preferably, the at least one drive motor is operated in the at least one overload operating mode for a time interval which is shorter than 1500 ms, preferably shorter than 1000 ms, in particular shorter than 500 ms, preferably shorter than 300 ms. Preferably, the at least one electric drive motor is deactivated or controlled into nominal operating mode again after the time interval. The operation of the at least one electric drive motor in the at least one overload operating mode for the predefined time interval thus effectuates no thermal damage thereof.

The at least brief operation of the at least one electric drive motor in the at least one overload operating mode may be used for bridging a time delay in building a further braking torque of an on-board braking device/braking system. In particular, the at least one wheel of the vehicle may be decelerated with the aid of the at least one electric drive motor which is controlled into the at least one overload operating mode, until the (immanent) delay in building the braking torque of at least one friction brake of the braking device/braking system is overcome. With the aid of the present invention, for example, down times and/or too low dynamics of an additional/an actual braking device of the vehicle may be bridged. In this way, the present invention may also be used for equipping a vehicle with a less complex, in particular more cost-effective braking device, which may be equipped, for example, with a smaller and less powerful motor and/or a less voluminous/simpler pump. At the same time, already in such a braking device, the present invention ensures a faster and more reliable carrying out of driver assistance functions, for example, pedestrian protection functions.

The advantages described above are also ensured with the aid of a refinement of the brake control device and of the method for operating at least one electric drive motor.

Furthermore, the advantages may be realized with the aid of a braking system for a vehicle having such a brake control device or its refinement.

DETAILED DESCRIPTION

Figure 1:
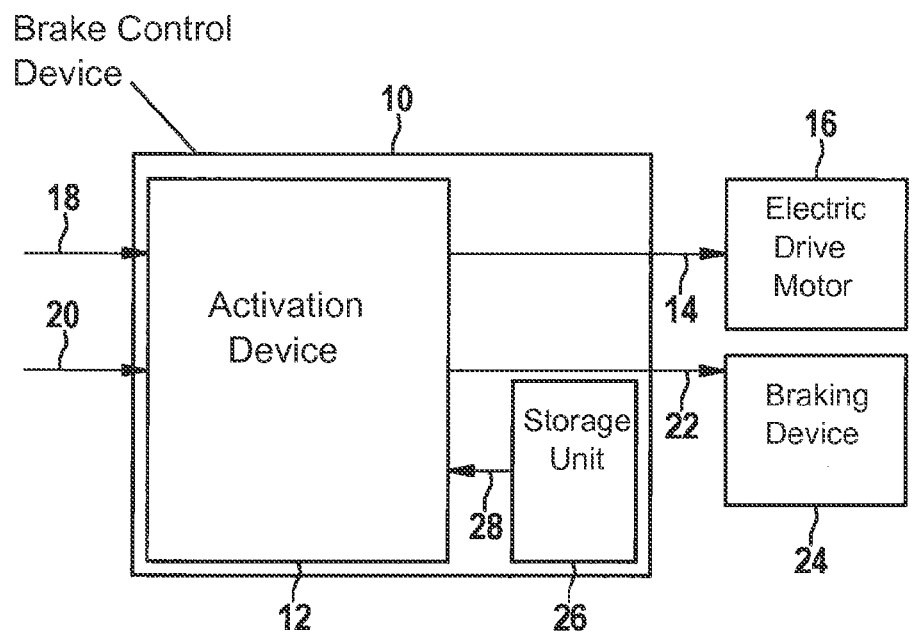
FIG. 1 shows a schematic illustration of one specific embodiment of the brake control device.

FIG. 1 shows a schematic representation of one specific embodiment of the brake control device.

The brake control device 10 shown in FIG. 1 may be installed in a vehicle. A vehicle equipped with brake control device 10 may, for example, be a hybrid vehicle or an electric vehicle. It is pointed out that the usability of brake control device 10 is not limited to a specific vehicle type.

Brake control device 10 includes an activation device 12, with the aid of which at least one first control signal 14 may be output to at least one electric drive motor 16 of the vehicle. The at least one electric drive motor 16 is controllable with the aid of the at least one first control signal 14 into a motor mode, in which a generator braking torque unequal to zero is exertable on at least one wheel (not shown) of the vehicle using the at least one electric drive motor 16 (preferably including the control unit of the drive motor 16 and the power electronics). In this case, the at least one electric drive motor 16 is controllable with the aid of the at least one first control signal 14 into at least one overload operating mode as the motor mode. Brake control device 10 thus makes use of the advantage that with the aid of the at least one electric drive motor 16, which is controlled into the at least one overload operating mode, a generator braking torque unequal to zero is exertable on the at least one wheel, the generator braking torque of the at least one electric drive motor 16 operated in the at least one overload operating mode generally being larger than the generator braking torque exerted during a nominal operation of the at least one electric drive motor 16.

The at least one overload operating mode is preferably to be understood to mean a mode of the at least one electric drive motor 16, in which a power is lead through it which, in the case of a longer energization duration, would result in overheating of the at least one electric drive motor 16. The at least one overload operating mode may also be referred to as a mode of the at least one electric drive motor 16, in which it is operated with a higher power than during nominal operation.

Preferably, brake control device 10 is designed to control the at least one electric drive motor 16 for a time interval in the at least one overload operating mode (without a temporary deactivation or operation in the nominal operating mode), the time interval being shorter than 1500 ms (milliseconds), preferably shorter than 1000 ms, in particular shorter than 500 ms, preferably shorter than 300 ms. In this way, thermal damage to the at least one electric drive motor 16 may be reliably prevented.

By at least briefly operating the at least one electric drive motor 16 in the at least one overload operating mode, a faster/more instantaneous reduction of the instantaneous vehicle velocity is achievable.

Generally, an electric drive motor 16 is thermally designed in such a way that it is able to withstand a brief operation in the at least one overload operating mode without overheating. In this way, a plurality of cost-effective electric drive motors 16 may cooperate with brake control device 10.

The at least brief operation of the at least one electric drive motor 16 in the at least one overload operating mode may in particular be used for bridging a time delay in building a friction braking torque of a friction brake of a braking system of the vehicle. For example, the at least one wheel assigned to the at least one friction brake may be decelerated with the aid of the at least one electric drive motor 16, operated in its overload operating mode, until a (immanent) delay in building the friction braking torque is overcome. The vehicle equipped with brake control device 10 and the at least one electric drive motor 16 may thus be decelerated rapidly, even when it is equipped with a braking device which has comparably low dynamics and relatively long down times. For the equipment of the vehicle, a cost-effective braking device is thus sufficient, cost reductions in the usable braking device generally exceeding possible costs of thermal protection equipment of the at least one electric drive motor 16. Most notably, costs for powerful motors and/or pumps having a high pump pressure may be saved. It is also pointed out that despite installing a cost-effective braking device in the vehicle having brake control device 10 and the at least one electric drive motor 16, a plurality of safety functions, for example, pedestrian accident protection which is quickly carried out, may be carried out reliably.

Outputting the at least one first control signal 14 for at least briefly controlling the at least one electric drive motor 16 operated in the at least one overload operating mode takes place under consideration of at least one brake demand signal 18 supplied by an on-board sensor and/or control device. Brake demand signal 18 may, for example, be supplied by a vehicle on-board sensor regarding an actuation of a brake input element, for example, a brake pedal. The sensor used for supplying brake demand signal 18 may be a brake force sensor, or a brake pressure sensor, a brake travel sensor, in particular a rod displacement sensor, for example. Brake demand signal 18 may also include information about how fast a driver of the vehicle actuates the brake actuating element. A signal provided by an automated speed control system and/or an automated emergency braking system may, however, also be taken into account by activation device 12 as brake demand signal 18.

The at least one electric drive motor 16 may be a single drive motor 16. The vehicle may also have multiple electric drive motors 16, which, for example, are assigned to each of the axes of the vehicle or to each wheel of the vehicle and act thereon.

In the specific embodiment in FIG. 1, activation device 12 is also designed to output the at least one first control signal 14, additionally taking a gas pedal signal 20 regarding an actuation of a gas pedal into account. For example, activation device 12 may be designed to detect an abrupt end of gas pedal actuation and a following, brief, strong brake actuation of the driver with the aid of signal 18 and 20, and, if necessary, to output at least the at least first control signal 14.

Preferably, activation device 12 is also designed to output at least a second control signal 22, in addition to the first control signal 14, to a braking device 24 of the vehicle having at least one (additional) friction brake (not shown), the braking device 24 being activatable using the at least one second control signal 22 in such a way that a friction braking torque unequal to zero is exertable on the at least one wheel using the at least one friction brake simultaneously to the generator braking torque. Preferably, the activation device 12 is also designed to output the at least one second control signal 22 under consideration of the at least one brake demand signal 18 and/or the at least one gas pedal signal 20 regarding the actuation of the gas pedal. Braking device 24, which is additionally activatable with the aid of brake control device 10, may, for example, be a pneumatic friction brake, a hydraulic friction brake and/or an electric friction brake. In one advantageous specific embodiment, activation device 12 may, for example, be designed to activate a hydraulic braking system as braking device 24 with the aid of the at least one second control signal 22 in such a way that the friction braking torque which is unequal to zero is exertable on the at least one wheel by the at least one wheel brake cylinder of the hydraulic braking system as at least one friction brake. With the aid of the at least one second control signal 22, for example, at least one valve, at least one pump and/or one brake booster of the hydraulic braking system may be activatable. Brake control device 10 may thus cooperate with a plurality of different types of braking device 24. In particular with the multi-functionality of brake control device 10 it is ensured that the functionalities of braking device 24 and of the at least one electric drive motor 16 operable as a generator are optimally coordinated.

Furthermore, activation device 12 may be designed to compare the brake demand signal 18, which is provided by the on-board sensor, regarding the actuation of the brake input element and/or gas pedal signal 20, with at least one normal value range 28 (which is provided by storage unit 26). If the at least one brake demand signal 18 and/or gas pedal signal 20 lie(s) outside of the at least one normal value range 28, activation device 12 is preferably designed to control the at least one electric drive motor 24 with the aid of the at least one first control signal 22 into the at least one overload operating mode. Otherwise, activation device 12 may be designed to control the at least one drive motor 16 (maximally) in a nominal operating mode. Thus, the at least one electric drive motor 16 may preferably only be controlled into the at least one overload operating mode when it is establishable due to an actuation of the brake input element and/or the gas pedal that the driver intends a sudden deceleration of the vehicle. In particular in an emergency braking situation, the vehicle may thus be rapidly and reliably brought to a standstill by operating the at least one electric drive motor 16 as a generator in the at least one overload operating mode.

Activation device 12 may in particular be designed to operate the at least one electric drive motor 16 in various overload operating modes. For example, activation device 12 is designed to control the at least one electric drive motor 16 with the aid of the at least one first control signal 14 for a first time interval into a first overload operating mode having a first degree of utilization and for a second time interval into a second overload operating mode having a second degree of utilization, which is less than the first degree of utilization. Thermal damage of the at least one electric drive motor 16 is, for example, reliably prevented when activation device 12 is designed to control the at least one electric drive motor 16 with the aid of the at least one first control signal 14 for the first time interval into the first overload operating mode having the first degree of utilization of 70% overload and for the second time interval into the second overload operating mode having the second degree of utilization of 30% overload. The length of the first time interval and/or the second time interval may, for example, be 200 ms (milliseconds). With the aid of such operation of the at least one electric drive motor 16, a down time of braking device 24 may be bridged reliably so that the vehicle is brakeable rapidly with a comparatively long deceleration. At the same time, an electric drive motor 16 may generally be operated without overheating for the entire duration of the time intervals.

The advantages explained above are also ensured in a braking system for a vehicle having a corresponding brake control device 10.

Figure 2A:
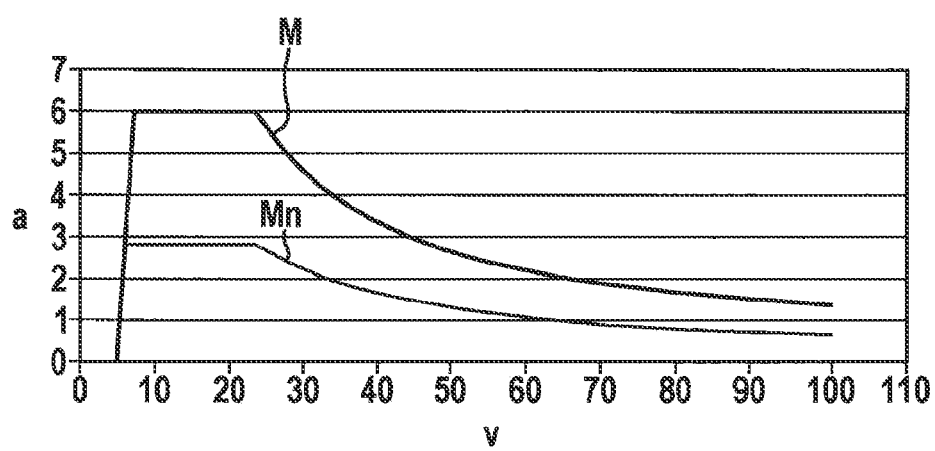
FIGS. 2a and 2b show coordinate systems for explaining one specific embodiment of the method for operating at least one electric drive motor.
Figure 2B:
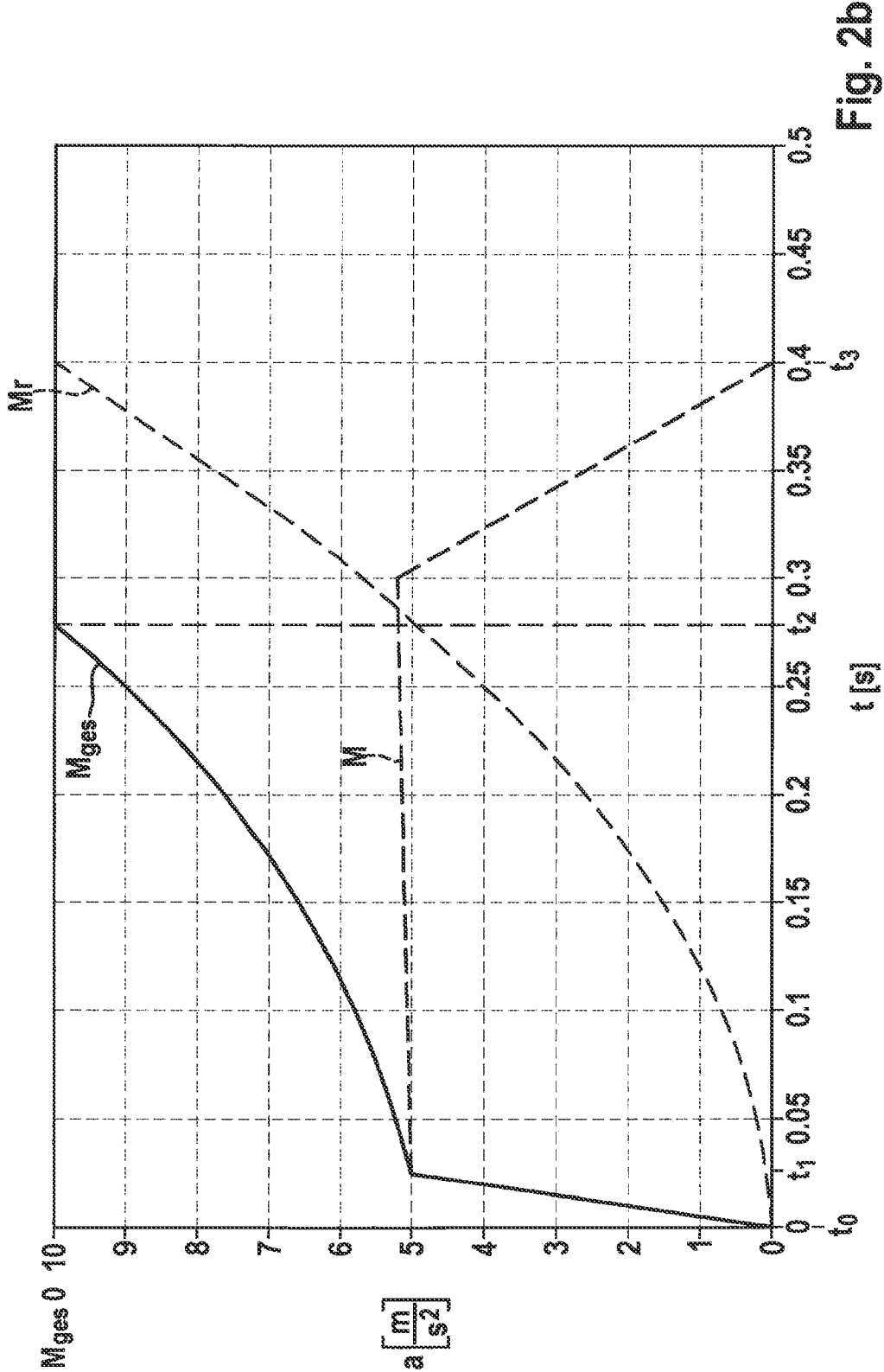

FIGS. 2a and 2b show coordinate systems for explaining one specific embodiment of the method for operating at least one electric drive motor.

The method described below may, for example, be carried out by the brake control device explained above. However, the practicability of the method is not limited to the use of such a brake control device.

In one embodiment of the method described below, at least one electric drive motor is operated in a motor mode for a brake demand in which a generator braking torque unequal to zero is exerted by the at least one electric drive motor on at least one wheel of the vehicle equipped with the at least one electric drive motor. In this case, the at least one electric drive motor is operated in at least one overload operating mode as the motor mode.

As shown in the coordinate system of FIG. 2a, the at least one electric drive motor, which is operated in the at least one overload operating mode, exerts a generator braking torque M unequal to zero on the at least one wheel. Generator braking torque M, which is exerted by the at least one electric drive motor, which is operated in the at least one overload operating mode, may be a function of a velocity v of the vehicle, which is shown with the aid of the abscissa of the coordinate system in FIG. 2a. For comparison purposes, a nominal operation generator braking torque Mn, which may be maximally exerted on the at least one assigned wheel with the aid of an electric drive motor in its nominal operating mode, is plotted in the coordinate system of FIG. 2a. As is apparent from the comparison of graphs M and Mn, a larger absolute value a of a negative deceleration of the vehicle braked in this way is effectuated during the at least brief operation of the at least one electric drive motor in the at least one overload operating mode. Absolute value a of the negative deceleration is plotted as the ordinate of the coordinate system of FIG. 2a.

In the method described here, a braking device of the vehicle having at least one (additional) friction brake is operated in such a way (in the case of a brake demand) that simultaneously with a generator braking torque M a friction braking torque Mr which is unequal to zero is exerted on the at least one wheel by the at least one friction brake. The brake demand is recognized at a point in time to, which is plotted with the aid of the abscissa of the coordinate system of FIG. 2b as time axis t (in seconds). (The ordinate of the coordinate system of FIG. 2b shows absolute value a of the negative acceleration (in $m/s^2$)). The brake demand may, for example, be a brake demand of the driver via actuating a brake input element. Examples for a suitable brake input element and an employable sensor for recognizing the brake demand of the driver have already been described above. However, the brake demand may also be recognized due to a signal of an automated speed control system and/or an emergency braking system.

In addition, the at least one electric drive motor may also be controlled into the at least one overload operating mode taking an actuation of a brake pedal into account. In order to recognize a situation in which the driver intends a preferably rapid deceleration of the vehicle, a first actuation force of an actuation of a brake input element and/or a second actuation force of an actuation of the gas pedal may be compared to at least one normal value range as the brake demand. With the aid of such an evaluation of at least one of these variables, an emergency braking situation may be recognized reliably. If the first actuation force and/or the second actuation force lie(s) outside of the at least one normal value range, the at least one electric drive motor is preferably controlled into the at least one overload operating mode. Otherwise, controlling the at least one electric drive motor in its nominal mode (maximum) is preferred. The first actuation force and/or the second actuation force may also be understood to be derivations over time of a force exerted on the respective actuation element, of a pressure exerted thereon and/or of an adjustment travel of the respective actuation element. For example, controlling/operating the at least one electric drive motor in the at least one overload operating mode may be carried out after recognizing an abrupt release of the gas pedal and a following strong brake actuation.

With the aid of the method described here, a comparatively large generator braking torque of the at least one electric drive motor operated in the at least one overload operating mode may be built up even in a short time interval between times t0 and t1. In contrast, the dynamics of the braking device having the at least one friction brake is so small that at a time t1 the friction braking torque Mr is still (nearly) equal to zero. However, a comparatively large total braking torque Mges (from friction braking torque Mr and generator braking torque M) is exertable on at least one wheel of the vehicle due to generator braking torque M as early as time t1.

At a time t2, friction braking torque Mr has increased so much that total braking torque Mges equals a predefined setpoint total braking torque Mges0. For this reason, from time t2 on the at least one electric drive motor, which was previously operated in its overload operating mode, is slowly deactivated. This effects a reduction of generator braking torque M to (nearly) zero until a point in time t3. At the same time, friction braking torque Mr continues to be increased so that total braking torque Mges is within predefined setpoint total braking torque Mges0. In this way, the at least one electric drive motor may be reliably protected from overheating and, at the same time, the vehicle may be brought rapidly to a standstill with the intended deceleration.

The ramp down of the at least one electric drive motor previously operated in its overload operating mode and the simultaneous increase of friction torque Mr may be carried out with a suitable strategy, for example, by using transitional characteristic curves. A master-slave operation may also be used, the master principle setting, for the slave system, the braking torque which is to be proportionally provided.

In one refinement of the method, the at least one electric drive motor may also be ramped down gradually. For example, the at least one electric drive motor may be operated for a first time interval in a first overload operating mode having a first degree of utilization and for a second time interval in a second overload operating mode having a second degree of utilization, which is less than the first degree of utilization. The first degree of utilization may, for example, be 70% overload, while the second degree of utilization may be reduced to 30% overload. The numeric values given here are only to be interpreted as examples, however. In this way, the at least one electric drive motor may be ramped down in such a way that a relatively high total braking torque Mges is exerted on the at least one assigned wheel while the at least one electric drive motor is protected reliably from overheating.

The use of the brake control device described above or the explanations of the method described here are recognizable by measuring the current flow through the at least one electric drive motor of a vehicle during a rapid stop, for example, an emergency braking. Furthermore, these facts may be established using the ratio of the brake pressure of the at least one friction brake to the total vehicle deceleration.

What is claimed is:

1. A brake control device for a vehicle, comprising:
    an activation device, with the aid of which, at least under consideration of at least one brake demand signal provided by at least one of an on-board sensor and a control device, at least one first control signal is output to at least one electric drive motor of the vehicle with which the at least one electric drive motor is controllable into a motor mode in which a generator braking torque unequal to zero is exerted on at least one wheel of the vehicle by the at least one electric drive motor, wherein:
    the at least one electric drive motor is controllable with the aid of the at least one first control signal into at least one overload operating mode as the motor mode, in which the generator braking torque which is unequal to zero is exerted on the at least one wheel, wherein the at least one electric driver motor is operated in the overload operating mode for a predetermined time interval that is set by the activation device or corresponds to a time delay in building a friction braking torque by at least one friction brake of a braking device of the vehicle.

2. The brake control device as recited in claim 1, wherein with the aid of the activation device in addition to the at least one first control signal at least one second control signal is output to the braking device of the vehicle having the at least one friction brake, with which the braking device is controllable in such a way that the friction braking torque which is unequal to zero is exerted on the at least one wheel by the at least one friction brake, simultaneously with the generator braking torque.

3. The brake control device as recited in claim 2, wherein the activation device controls a hydraulic braking system as the braking device with the aid of the at least one second control signal in such a way that the friction braking torque which is unequal to zero is exerted on the at least one wheel by at least one wheel brake cylinder of the hydraulic braking system as the at least one friction brake.

4. The brake control device as recited in claim 2, wherein the activation device outputs at least one of the at least one first control signal and the at least one second control signal in response to a gas pedal signal regarding an actuation of a gas pedal.

5. The brake control device as recited in claim 4, wherein:
    the activation device compares at least one of (1) the brake demand signal, which was provided by an on-board sensor regarding an actuation of a brake input element, and (2) the gas pedal signal to at least one normal value range, and
    if the at least one of the at least one brake demand signal and the gas pedal signal lies outside of the at least one normal value range, the activation device controls the at least one electric drive motor with the aid of the at least one first control signal into the at least one overload operating mode.

6. The brake control device as recited in claim 1, wherein the activation device controls the at least one electric drive motor with the aid of the at least one first control signal for a first time interval into a first overload operating mode having a first degree of utilization and for a second time interval into a second overload operating mode having a second degree of utilization, which is less than the first degree of utilization.

7. The brake control device as recited in claim 6, wherein the activation device controls the at least one electric drive motor with the aid of the at least one first control signal for the first time interval into the first overload operating mode having the first degree of utilization of 70% overload and for the second time interval into the second overload operating mode having the second degree of utilization of 30% overload.

8. A braking system for a vehicle, comprising:
    a brake control device for a vehicle, including:
        an activation device, with the aid of which, at least under consideration of at least one brake demand signal provided by at least one of an on-board sensor and a control device, at least one first control signal is output to at least one electric drive motor of the vehicle with which the at least one electric drive motor is controllable into a motor mode in which a generator braking torque unequal to zero is exerted on at least one wheel of the vehicle by the at least one electric drive motor, wherein:
        the at least one electric drive motor is controllable with the aid of the at least one first control signal into at least one overload operating mode as the motor mode, in which the generator braking torque which is unequal to zero is exerted on the at least one wheel, wherein the at least one electric driver motor is operated in the overload operating mode for a predetermined time interval that is set by the activation device or corresponds to a time delay in building a friction braking torque by at least one friction brake of a braking device of the vehicle.

9. A method for operating at least one electric drive motor for a vehicle, comprising:
operating the at least one electric drive motor in the case of a brake demand in a motor mode, in which a generator braking torque which is unequal to zero is exerted on at least one wheel of the vehicle by the at least one electric drive motor, wherein the at least one electric drive motor is operated in at least one overload operating mode as the motor mode in which the generator braking torque which is unequal to zero is exerted on the at least one wheel, wherein the at least one electric driver motor is operated in the overload operating mode for a predetermined time interval that is set by an activation device or corresponds to a time delay in building a friction braking torque by at least one friction brake of a braking device of the vehicle.

10. The method as recited in claim 9, further comprising:
Operating the braking device of the vehicle having the at least one friction brake in such a way that the friction braking torque which is unequal to zero is exerted on the at least one wheel by the at least one friction brake, simultaneously with the generator braking torque.

11. The method as recited in claim 9, wherein the at least one electric drive motor is controlled into the at least one overload operating mode in response to an actuation of a gas pedal.

12. The method as recited in claim 9, further comprising:
as the brake demand, comparing at least one of a first actuation force of an actuation of a brake input element and a second actuation force of an actuation of a gas pedal to at least one normal value range; and
if the at least one of the first actuation force and the second actuation force lies outside of the at least one normal value range, controlling the at least one electric drive motor into the at least one overload operating mode.

13. The method as recited in claim 9, further comprising:
operating the at least one electric drive motor for a first time interval in a first overload operating mode having a first degree of utilization, and for a second time interval in a second overload operating mode having a second degree of utilization, which is less than the first degree of utilization.

14. The method as recited in claim 13, wherein the at least one electric drive motor is operated for the first time interval in the first overload operating mode having the first degree of utilization of 70% overload, and for the second time interval in the second overload operating mode having the second degree of utilization of 30% overload.

15. A brake control device for a vehicle, comprising:
an activation device, with the aid of which, at least under consideration of at least one brake demand signal provided by at least one of an on-board sensor and a control device, at least one first control signal is output to at least one electric drive motor of the vehicle with which the at least one electric drive motor is controllable into a motor mode in which a generator braking torque unequal to zero is exerted on at least one wheel of the vehicle by the at least one electric drive motor, wherein:
the at least one electric drive motor is controllable with the aid of the at least one first control signal into at least one overload operating mode as the motor mode, in which the generator braking torque which is unequal to zero is exerted on the at least one wheel,
the at least one electric driver motor is operated in the overload operating mode for a predetermined time interval that is set by the activation device or corresponds to a time delay in building a friction braking torque by at least one friction brake of a braking device of the vehicle, and
the at least one electric drive motor is operated in a nominal operating mode upon expiration of the predetermined time interval of the overload operating mode.

16. A braking system for a vehicle, comprising:
a brake control device for a vehicle, including:
an activation device, with the aid of which, at least under consideration of at least one brake demand signal provided by at least one of an on-board sensor and a control device, at least one first control signal is output to at least one electric drive motor of the vehicle with which the at least one electric drive motor is controllable into a motor mode in which a generator braking torque unequal to zero is exerted on at least one wheel of the vehicle by the at least one electric drive motor, wherein:
the at least one electric drive motor is controllable with the aid of the at least one first control signal into at least one overload operating mode as the motor mode, in which the generator braking torque which is unequal to zero is exerted on the at least one wheel,
the at least one electric driver motor is operated in the overload operating mode for a predetermined time interval that is set by the activation device or corresponds to a time delay in building a friction braking torque by at least one friction brake of a braking device of the vehicle, and
the at least one electric drive motor is operated in a nominal operating mode upon expiration of the predetermined time interval of the overload operating mode.

17. A method for operating at least one electric drive motor for a vehicle, comprising:
operating the at least one electric drive motor in the case of a brake demand in a motor mode, in which a generator braking torque which is unequal to zero is exerted on at least one wheel of the vehicle by the at least one electric drive motor, wherein the at least one electric drive motor is operated in at least one overload operating mode as the motor mode in which the generator braking torque which is unequal to zero is exerted on the at least one wheel, wherein:
the at least one electric driver motor is operated in the overload operating mode for a predetermined time interval that is set by an activation device or corresponds to a time delay in building a friction braking torque by at least one friction brake of a braking device of the vehicle, and
the at least one electric drive motor is operated in a nominal operating mode upon expiration of the predetermined time interval of the overload operating mode.

18. A brake control device for a vehicle, comprising:
an activation device, with the aid of which, at least under consideration of at least one brake demand signal provided by at least one of an on-board sensor and a control device, at least one first control signal is output to at least one electric drive motor of the vehicle with which the at least one electric drive motor is controllable into a motor mode in which a generator braking torque unequal to zero is exerted on at least one wheel of the vehicle by the at least one electric drive motor, wherein:

the at least one electric drive motor is controllable with the aid of the at least one first control signal into at least one overload operating mode as the motor mode, in which the generator braking torque which is unequal to zero is exerted on the at least one wheel, and the activation device controls the at least one electric drive motor with the aid of the at least one first control signal for a first time interval into a first overload operating mode having a first degree of utilization, and for a second time interval into a second overload operating mode having a second degree of utilization that is less than the first degree of utilization.

19. A method for operating at least one electric drive motor for a vehicle, comprising:

operating the at least one electric drive motor in the case of a brake demand in a motor mode, in which a generator braking torque which is unequal to zero is exerted on at least one wheel of the vehicle by the at least one electric drive motor, wherein:

the at least one electric drive motor is operated in at least one overload operating mode as the motor mode in which the generator braking torque which is unequal to zero is exerted on the at least one wheel, and the at least one electric drive motor is operated for a first time interval in a first overload operating mode having a first degree of utilization, and for a second time interval in a second overload operating mode having a second degree of utilization that is less than the first degree of utilization.

* * * * *